United States Patent
Kee et al.

(10) Patent No.: US 7,508,477 B2
(45) Date of Patent: Mar. 24, 2009

(54) LIQUID CRYSTAL DISPLAY PANEL FOR MULTI-DISPLAY

(75) Inventors: In-seo Kee, Seongnam-si (KR); Ho-nyeon Lee, Seongnam-si (KR); Sung-kee Kang, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 272 days.

(21) Appl. No.: 11/544,186

(22) Filed: Oct. 6, 2006

(65) Prior Publication Data

US 2007/0252935 A1 Nov. 1, 2007

(30) Foreign Application Priority Data

Apr. 26, 2006 (KR) .................... 10-2006-0037724

(51) Int. Cl.
*G02F 1/1343* (2006.01)

(52) U.S. Cl. ..................................................... 349/139

(58) Field of Classification Search ....................... None
See application file for complete search history.

(56) References Cited

U.S. PATENT DOCUMENTS

| | | | | |
|---|---|---|---|---|
| 6,639,644 | B1* | 10/2003 | Tateno et al. | 349/155 |
| 2003/0071959 | A1* | 4/2003 | Koyama | 349/156 |
| 2005/0078240 | A1* | 4/2005 | Murade | 349/110 |

* cited by examiner

*Primary Examiner*—Michelle R. Connelly-Cushwa
*Assistant Examiner*—Chris Chu
(74) *Attorney, Agent, or Firm*—Cantor Colburn LLP

(57) ABSTRACT

An LCD panel for a multi-display includes main electrodes disposed on an image display region and include liquid crystals that react to a voltage applied between the main electrodes, and dummy electrodes disposed on regions outside the image display region to prevent the distortion of electric fields of adjacent main electrodes. The dummy electrodes have a width of approximately 5 to 50% of a width of the main electrodes. The dummy electrodes are disposed along edges of the main electrodes in a single row.

8 Claims, 2 Drawing Sheets

LIQUID CRYSTAL DISPLAY PANEL FOR MULTI-DISPLAY

This application claims priority to Korean Patent Application No. 10-2006-0037724, filed on Apr. 26, 2006, and all the benefits accruing therefrom under 35 U.S.C. §119, the contents of which are incorporated herein in its entirety by reference.

BACKGROUND OF THE INVENTION

1. Field of the Invention

The present invention relates to a liquid crystal display ("LCD") panel for a multi-display, and more particularly, to an LCD panel for a multi-display that can reduce the size of a seam in a non-image display region.

2. Description of the Related Art

A multi-display realizes a large screen by connecting multiple display panels. In earlier stages of display technology, the large screen was realized by connecting multiple Brown tubes, such as in a large television, as a display. Apparatuses that realize the large screen by connecting flat display panels such as LCDs have been made to meet the requirements for a large screen in small mobile devices such as personal digital assistants ("PDAs").

FIG. 1 is a perspective view illustrating a multi-display having a conventional LCD panel. As depicted in FIG. 1, the multi-display is realized by connecting unit panels 10. However, a black matrix 11 surrounds edge portions of the unit panel 10. Therefore, when the edges of the unit panels 10 are connected to each other, a seam where images are not seen continuously due to the black matrix 11 is formed, that is, images divided by the two panels look disconnected. Accordingly, to realize a smooth image the width of the edges of the unit panels 10 must be reduced as much as possible to minimize the size of the seam.

The edge portions of the unit panels 10 are surrounded by the black matrix 11 due to the following structural characteristics of the LCD panel. FIG. 2 is a cross-sectional view illustrating an LCD panel for explaining a principle of distortion of an electric field between electrodes 12 of the LCD panel. As depicted in FIG. 2, in the LCD panel, liquid crystals 13 are filled between both electrodes 12 disposed in a sub-pixel unit. The LCD panel has a structure where an arrangement of the liquid crystal molecules 13 changes when a voltage is applied to the electrodes 12 from a power source 14 to selectively transmit light from a light source (not shown).

However, the electric field formed at a central portion has a different electric field than formed at end portions when a voltage is applied between both electrodes 12. That is, the electric field is formed in a straight line between both electrodes 12 at the central portion, but the electric fields formed at the end portions bend outwards. The tendency of the electric field between electrodes in regions except the end portions of the LCD panel is offset by the electrodes 12 disposed to adjacent electrodes 12, but the electric fields at the end portions of the LCD panel where there are no adjacent electrodes 12 curvedly bend outwards (as illustrated by the dotted arrows in FIG. 2). When the electric field bends, the liquid crystals at the region where the electric field bends is arranged abnormally according to the shape of the electric field. Accordingly, the transmittance of light in this region cannot be controlled as desired. A brightness deviation occurs since the brightness of the corresponding region is not displayed as desired.

To address the above-mentioned problem, as depicted in FIG. 3, multiple rows, such as two to three (2-3) rows of dummy electrodes 15 are further disposed on edge regions of the unit panel 10 where the liquid crystal 13 is not filled in order to reduce or effectively prevent the distortion of the electric field. Upper parts of the dummy electrodes 15 are covered by the black matrix 11 since the upper parts of the dummy electrodes 15 are non-image display regions. Because the dummy electrodes 15 reduce or effectively prevent the distortion of the electric field of the electrodes 12 disposed at end portions of the LCD panel that do not contribute to display image, a much lower voltage may be applied to the dummy electrodes 15 than a voltage applied to the electrodes 12. Alternatively, the dummy electrodes 15 may be left floating.

However, when a multi-display is realized using the LCD panel on which connecting edges are surrounded by the black matrix 11, an image discontinuity region is too large. That is, the black matrix 11 blocks the leakage of light at the dummy electrodes 15 which do not contribute to display image. The dummy electrodes 15, like other electrodes 12, have a size equal to a sub-pixel, and are arranged in multiple rows to affect the electrodes 12 disposed at edges of the LCD panel with a low voltage. Therefore, an overall width of the dummy electrodes 15 reaches from 200 microns ($\mu$m) to 300 microns ($\mu$m). Accordingly, when attaching the widths of the dummy electrodes 15 to form a screen, the image discontinuity region may approximately reach a total of about 400 $\mu$m to 600 $\mu$m, thereby generating very unstable images.

Accordingly, to realize a smooth multi-display image, the development of an LCD panel that can reduce the seam in the non-display region of the LCD panel is required.

BRIEF SUMMARY OF THE INVENTION

An exemplary embodiment provides a liquid crystal display ("LCD") panel for a multi-display that can realize a stably connected image between multiple display panels by reducing the size of a seam portion in a non-image display region of the display panel.

In an exemplary embodiment there is provided an LCD panel for a multi-display that includes main electrodes and dummy electrodes. The main electrodes are disposed on an image display region and include liquid crystals that react to a first voltage applied between the main electrodes. The dummy electrodes are disposed on regions outside the image display region to prevent the distortion of electric fields of the adjacent main electrodes. A dummy electrode has a width of approximately 5 to 50% of a width of a main electrode and the dummy electrodes are disposed along edges of the main electrodes in a single row.

In an exemplary embodiment, a second voltage higher than the first voltage applied to the main electrodes may be applied to the dummy electrodes.

In an exemplary embodiment, the second voltage applied to the dummy electrodes may vary while being synchronized with the first voltage applied to the main electrodes.

An exemplary embodiment of a method of forming an LCD panel includes forming main electrodes, forming dummy electrodes, disposing the main electrodes on an image display region and disposing the dummy electrodes on regions outside of the image display region in a single row. The main electrodes include a first width and liquid crystals between the main electrodes and the liquid crystal reacting to a first voltage applied to the main electrodes. The dummy electrodes include a second width approximately 5% to 50% of the first width and are applied with a second voltage.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
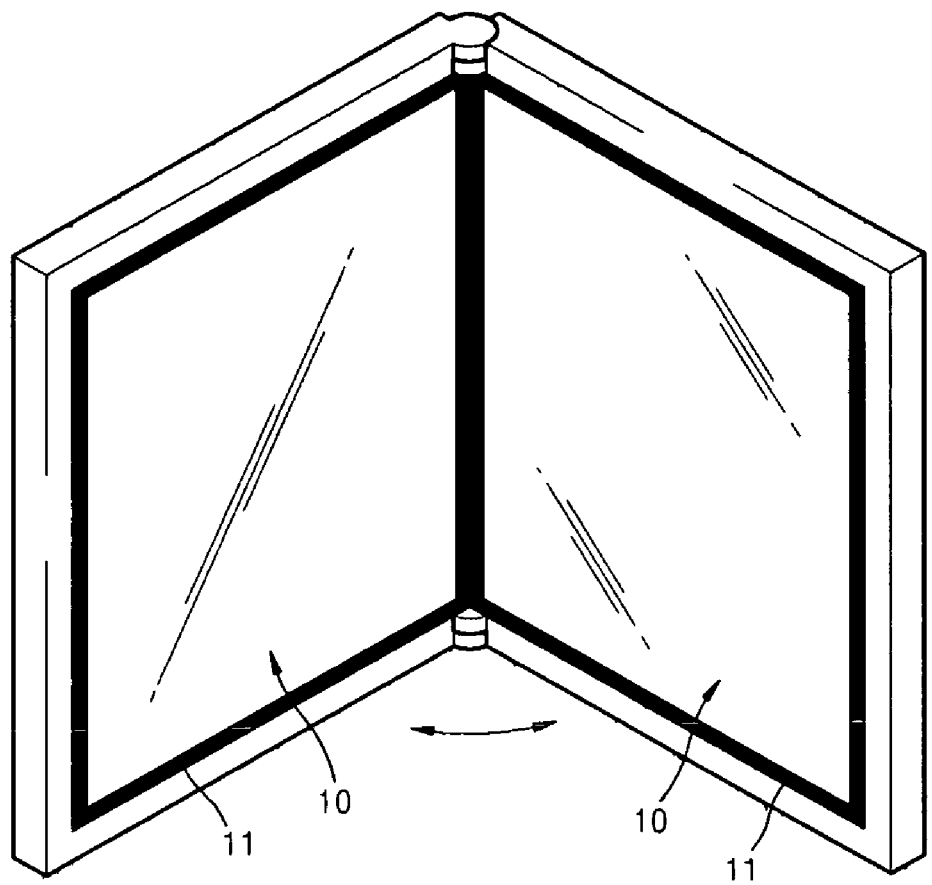
FIG. 1 is a perspective view illustrating a multi-display having a conventional liquid crystal display ("LCD") panel of the prior art.
Figure 2:
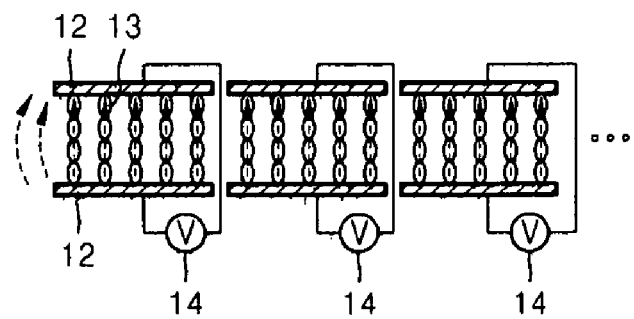
FIG. 2 is a cross-sectional view illustrating an LCD panel for explaining a principle of distortion of an electric field between electrodes of the LCD panel of the prior art.
Figure 3:
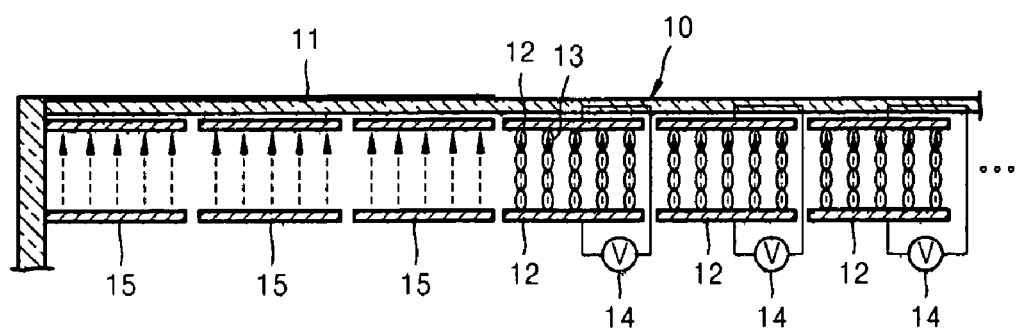
FIG. 3 is a cross-sectional view illustrating an inner structure of the LCD panel for a conventional multi-display of the prior art.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention will now be described more fully with reference to the accompanying drawings in which exemplary embodiments of the invention are shown.

Figure 4:
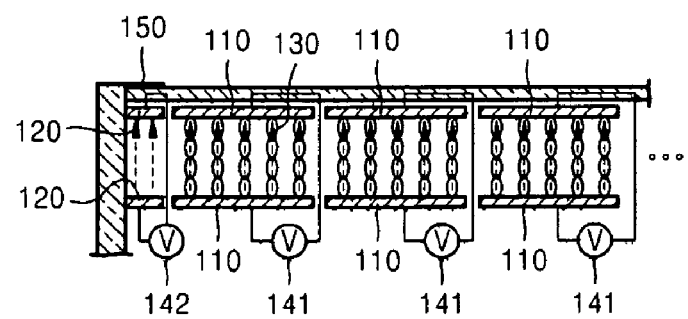
FIG. 4 is a cross-sectional view illustrating an exemplary embodiment of an inner structure of an LCD panel for a multi-display according to the present invention.

FIG. 4 is a cross-sectional view illustrating an exemplary embodiment of an inner structure of a liquid crystal display ("LCD") panel for a multi-display according to the present invention. A particular aspect of the present invention is the arrangement of main electrodes 110 and dummy electrodes 120. Therefore, FIG. 4 includes the main electrodes 110, the dummy electrodes 120 and a liquid crystal layer 130.

The LCD panel includes the main electrodes 110 disposed on an image display region and the dummy electrodes 120 disposed on regions outside the image display region to reduce or effectively prevent the distortion of electric fields of the main electrodes 110 disposed at end portions of the image display region. The main electrodes 110 include the liquid crystal layer 130 that reacts to a voltage applied between the main electrodes 110. When electric fields are formed by a voltage applied to the main electrodes 110 from power sources 141, a phase of the liquid crystal layer 130 changes since the liquid crystal layer 130 reacts to the electric fields. As a result, the amount of light emitted from a light source (not shown) that passes through the liquid crystal layer 130 changes, and thus, a color of a pixel located on a corresponding position is determined.

In the illustrated exemplary embodiment, unlike in the prior art, the dummy electrodes 120 are disposed only in one row on edge regions of the LCD panel where the liquid crystal 130 is not filled. An individual dummy electrode 120 has a width approximately half that of a main electrode 110 to minimize the overall width (or area) of the dummy electrodes 120 covered by a black matrix 150, and thus, correspondingly reducing the non-image display region of the LCD panel. That is, when the width and the amount of rows of the dummy electrodes 120 are reduced in the LCD panel, the non-image display region covered by the black matrix 150 is also reduced corresponding to the reduction of the width and the rows of the dummy electrodes 120. Advantageously, the discontinuity of images at a seam can be significantly reduced when two LCD panels are connected to make a multi-display.

When the width of the dummy electrodes 120 is reduced, an electrical force for reducing or effectively preventing the distortion of the electric fields of the main electrodes 110 may be reduced. A higher voltage than a voltage applied to the main electrodes 110 may be applied to the dummy electrodes 120. In the prior art, the distortion of the electric field can be reduced or prevented even at a floating state since the dummy electrodes having a larger size are disposed in 2-3 rows. However, as in the illustrated exemplary embodiment, the number and size of the dummy electrodes 120 are relatively greatly reduced to reduce the non-image display region. In an exemplary embodiment, a voltage may be increased enough to affect adjacent main electrodes 110.

In one exemplary embodiment, when 5V is applied to the adjacent main electrode 110, about 5.5V to about 6V, which is 10 to 20% of a higher voltage than 5V, may be applied to the dummy electrodes 120. If a constant voltage of 5.5 to 6V is continuously applied to the dummy electrodes 120 and when the voltage applied to the adjacent main electrode 110 is reduced to, e.g. 3V, an inverse distortion may occur. Accordingly, the voltage applied to the dummy electrodes 120 may be controlled to a level of approximately 10 to 20% higher than a voltage applied to the adjacent main electrodes 110 while synchronizing the voltage applied to the main electrodes 110. In an exemplary embodiment, a power source 142 for the dummy electrodes 120 and a power source 141 for the main electrodes 110 may be separately configured.

As in the illustrated exemplary embodiment, the LCD panel has a significantly reduced region covered by the black matrix 150 since the region of the dummy electrodes 120, which are on the non-image display regions, is greatly reduced. In one exemplary embodiment, the width of the non-image display region is reduced to about ⅙ compared to where dummy electrodes having the same size as the main electrodes are disposed in three rows. When a multi-display is realized by connecting the LCD panels having reduced non-image display regions of the illustrated exemplary embodiment, smooth images can be displayed at the seam.

Considering that an image at the seam is usually smooth when the width of the main electrodes 110 is about 100 μm and that of a region covered by the black matrix 150 at a side (or edge) of the panel is 50 μm or less, it is more effective when the width of the dummy electrodes 120 is manufactured to about half the width of the main electrodes 110 or less. In one exemplary embodiment, due to the problems in that the manufacturing of dummy electrodes 120 having a small width is difficult and a relatively higher voltage must be applied to have smooth images, the dummy electrodes 120 may be formed to have the width of 5 to 50% of the width of the main electrodes 110.

As in the illustrated exemplary embodiment, when the size of the dummy electrodes 120 is reduced to reduce the non-image display region, a smooth image can be realized at the seam between LCD panels, thereby realizing high quality multi-images.

LCD panels for a multi-display as in the illustrated exemplary embodiment allow smooth images at a seam where two screens are connected to each other since non-image display regions of the edges of the LCD panels where dummy electrodes are disposed are greatly reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A liquid crystal display (LCD) panel for a multi-display, the LCD panel comprising:
   main electrodes disposed on an image display region and comprising liquid crystals which react to a first voltage applied between the main electrodes, and
   dummy electrodes disposed in only a single row on regions outside the image display region, the dummy electrodes reduce and prevent the distortion of electric fields of adjacent main electrodes,
   wherein a dummy electrode includes a width of approximately 5% to 50% of a width of a main electrode and the dummy electrodes are disposed along edges of the main electrodes in the single row.

2. The LCD panel of claim 1, wherein a second voltage higher than the first voltage is applied to the dummy electrodes.

3. The LCD panel of claim 2, wherein the second voltage applied to the dummy electrodes varies while synchronized with the first voltage applied to the main electrodes.

4. The LCD panel of claim 2, wherein the second voltage is approximately 10% to 20% higher than the first voltage.

5. The LCD panel of claim 1, further comprising a black matrix covering the dummy electrodes.

6. A method of forming an LCD panel, the method comprising:
   forming main electrodes including a first width and liquid crystals between the main electrodes, the liquid crystal reacting to a first voltage applied to the main electrodes;
   forming dummy electrodes including a second width approximately 5% to 50% of the first width, the dummy electrodes being applied with a second voltage;
   disposing the main electrodes on an image display region; and
   disposing the dummy electrodes on regions outside of the image display region only in a single row.

7. The method of claim 6, wherein the second voltage is higher than the first voltage.

8. A liquid crystal display (LCD) panel for a multi-display, the LCD panel comprising:
   main electrodes disposed on an image display region and comprising liquid crystals which react to a first voltage applied between the main electrodes, and
   dummy electrodes disposed in only a single row on regions outside the image display region, a second voltage higher than the first voltage is applied to the dummy electrodes, the dummy electrodes reduce and prevent the distortion of electric fields of adjacent main electrodes,
   wherein a dummy electrode includes a width of approximately 5% to 50% of a width of a main electrode and the dummy electrodes are disposed along edges of the main electrodes in the single row.

* * * * *